United States Patent
Tsutsui

(10) Patent No.: US 8,165,727 B2
(45) Date of Patent: Apr. 24, 2012

(54) INFORMATION PROCESSING APPARATUS AND COOLING CONTROL METHOD

(75) Inventor: Tomonori Tsutsui, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 11/500,188

(22) Filed: Aug. 7, 2006

(65) Prior Publication Data

US 2007/0047199 A1 Mar. 1, 2007

(30) Foreign Application Priority Data

Aug. 30, 2005 (JP) .................................. 2005-249554

(51) Int. Cl.
- G05B 23/00 (2006.01)
- H01L 23/24 (2006.01)
- H05K 7/20 (2006.01)

(52) U.S. Cl. .......................... 700/300; 257/713; 361/695

(58) Field of Classification Search .................. 700/299, 700/300, 90; 165/104.34, 244; 257/713, 257/E31.131, E23.08; 361/688, 690, 69; 372/36; 454/184

See application file for complete search history.

(56) References Cited

U.S. PATENT DOCUMENTS

| | | | |
|---|---|---|---|
| 5,249,741 A | 10/1993 | Bistline et al. | |
| 6,014,611 A | 1/2000 | Arai et al. | |
| 6,243,656 B1 * | 6/2001 | Arai et al. | 702/132 |
| 6,873,883 B2 * | 3/2005 | Ziarnik | 700/300 |
| 7,215,541 B2 * | 5/2007 | Nelson | 361/690 |
| 7,480,587 B2 * | 1/2009 | Cancel | 702/132 |
| 7,502,952 B2 * | 3/2009 | Chotoku et al. | 713/340 |
| 7,844,170 B2 * | 11/2010 | Yao et al. | 388/804 |
| 2003/0063437 A1 * | 4/2003 | Kurihara | 361/688 |
| 2003/0220721 A1 * | 11/2003 | Cohen | 700/301 |
| 2005/0030171 A1 * | 2/2005 | Liu et al. | 340/500 |
| 2006/0174146 A1 * | 8/2006 | Prosperi et al. | 713/320 |
| 2006/0178785 A1 * | 8/2006 | Chang et al. | 700/300 |
| 2006/0193113 A1 * | 8/2006 | Cohen et al. | 361/687 |
| 2007/0046230 A1 * | 3/2007 | Tsutsui | 318/268 |
| 2009/0167228 A1 * | 7/2009 | Chung et al. | 318/455 |

(Continued)

FOREIGN PATENT DOCUMENTS

CN 1482524 3/2004

(Continued)

OTHER PUBLICATIONS

Japanese Office Action dated Apr. 1, 2008 for application No. 2005-249554, entitled Information Processing Apparatus and Cooling Control Method. (English Translation).

(Continued)

Primary Examiner — Albert Decady
Assistant Examiner — Jennifer L. Norton
(74) Attorney, Agent, or Firm — Blakely, Sokoloff, Taylor & Zafman LLP

(57) ABSTRACT

According to one embodiment, an information processing apparatus includes a main body, a heating device provided in the main body, a cooling fan provided in the main body, which cools the heating device, a temperature sensor provided in the main body, which senses a temperature of the heating device, and a fan control unit provided in the main body, which rotates the cooling fan at a first rotation speed or higher during power-on of the main body and switches a rotation speed of the cooling fan to a second rotation speed which is higher than the first rotation speed when the temperature of the heating device sensed by the temperature sensor reaches a given threshold value.

12 Claims, 12 Drawing Sheets

U.S. PATENT DOCUMENTS

| | | | | |
|---|---|---|---|---|
| 2009/0171513 A1* | 7/2009 | Tsukazawa | | 700/300 |
| 2010/0219784 A1* | 9/2010 | Chang | | 318/471 |
| 2010/0228403 A1* | 9/2010 | Eto | | 700/300 |
| 2010/0246058 A1* | 9/2010 | Yamamoto et al. | | 360/97.02 |
| 2010/0283431 A1* | 11/2010 | Kano | | 320/150 |
| 2011/0106332 A1* | 5/2011 | Lee | | 700/300 |

FOREIGN PATENT DOCUMENTS

| | | |
|---|---|---|
| JP | 08-063237 | 3/1996 |
| JP | 8-328698 | 12/1996 |
| JP | 08-328698 | 12/1996 |
| JP | 09-198166 | 7/1997 |
| JP | 11-15567 | 1/1999 |
| JP | 11-65712 | 3/1999 |
| JP | 11-233984 | 8/1999 |
| JP | 2000-112574 | 4/2000 |
| JP | 2001117675 | 4/2001 |
| JP | 2001125682 | 5/2001 |
| JP | 2001-355884 | 12/2001 |
| JP | 2003108268 | 4/2003 |
| JP | 2003124414 | 4/2003 |
| JP | 2003-167648 | 6/2003 |

OTHER PUBLICATIONS

Chinese Office Action dated Sep. 28, 2007 for application No. 2006101256612, filed on Aug. 30, 2005 entitled Information Processing Apparatus and Cooling Control Method.

* cited by examiner

| Setting | Temperature level of CPU | Silent fan control | | | |
|---|---|---|---|---|---|
| | Level | FAN 2 | FAN 1 | FAN 0 | CPU |
| Performance mode (AC drive) | 0 | - | Silent | Silent | 100% |
| | 1 | - | - | Low | 100% |
| | 2 | - | - | Mid | 100% |
| | 3 | - | - | High | 100% |
| | 4 | - | - | Max | 100% |
| Power-saving mode (battery drive) | 0 | - | Silent | Silent | 100% |
| | 1 | - | Silent | Silent | 75% |
| | 2 | - | Silent | Silent | 50% |
| | 3 | - | - | Low | 50% |
| | 4 | - | - | Mid | 50% |
| | 5 | - | - | High | 50% |
| | 6 | - | - | Max | 50% |

| | Rotation speed of fan |
|---|---|
| Silent | 1500 |
| Low | 3500 |
| Middle | 4500 |
| High | 5500 |
| Max | 6500 |

| | |
|---|---|
| FAN 0 | Δrpm/Δdigit characteristic |
| | Startup control signal value (startup rotation speed) |
| | Lowest rotation speed |
| | Target rotation speed |
| FAN 1 | Δrpm/Δdigit characteristic |
| | Startup control signal value (startup rotation speed) |
| | Lowest rotation speed |
| | Target rotation speed |

INFORMATION PROCESSING APPARATUS AND COOLING CONTROL METHOD

CROSS-REFERENCE TO RELATED APPLICATIONS

This application is based upon and claims the benefit of priority from Japanese Patent Application No. 2005-249554, filed Aug. 30, 2005, the entire contents of which are incorporated herein by reference.

BACKGROUND

1. Field

One embodiment of the invention relates to an information processing apparatus such as a personal computer. More specifically, the embodiment relates to an information processing apparatus having a cooling fan and a cooling control method applied to the apparatus.

2. Description of the Related Art

Various portable personal computers such as a laptop computer and a notebook computer have recently been developed. This type of personal computer includes a heating device such as a CPU, a display controller, a hard disk drive and a bus bridge device.

A cooling fan is known as a cooling mechanism for cooling the heating device described above.

Jpn. Pat. Appln. KOKAI Publication No. 9-198166 discloses a computer for controlling the speed of a fan in accordance with the temperature of a CPU. In this computer, the fan does not rotate when the temperature is lower than a given value but rotates when it reaches the value.

The rotation speed of a fan is usually set at a relatively high value in order to lower the temperature of a heating device with efficiency. When the fan rotates, it causes noise that makes a user uncomfortable. Particularly when the fan starts to rotate, its rotation speed abruptly increases from zero to a given value; therefore, noise that is offensive to the user is easy to generate.

Jpn. Pat. Appln. KOKAI Publication No. 8-328698 discloses a computer having a mode in which a CPU is cooled by rotating a fan and a mode in which the CPU is cooled without rotating the fan but by lowering the operation speed of the CPU. In the latter mode, the fan does not rotate and thus causes no noise that is offensive to a user. However, when the fan is not used, the CPU has to decrease in operation speed significantly in order to suppress heat generated from the CPU. Accordingly, the system performance is greatly lowered.

A new cooling function capable of compatibility between high system performance and low noise generation therefore needs to be achieved.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a heating device provided in a main body, a temperature sensor provided in the main body, which senses a temperature of the heating device, and a fan control unit provided in the main body, which rotates the cooling fan at a first rotation speed or higher during power-on of the main body and switches a rotation speed of the cooling fan to a second rotation speed which is higher than the first rotation speed when the temperature of the heating device sensed by the temperature sensor reaches a given threshold value.

Figure 1:
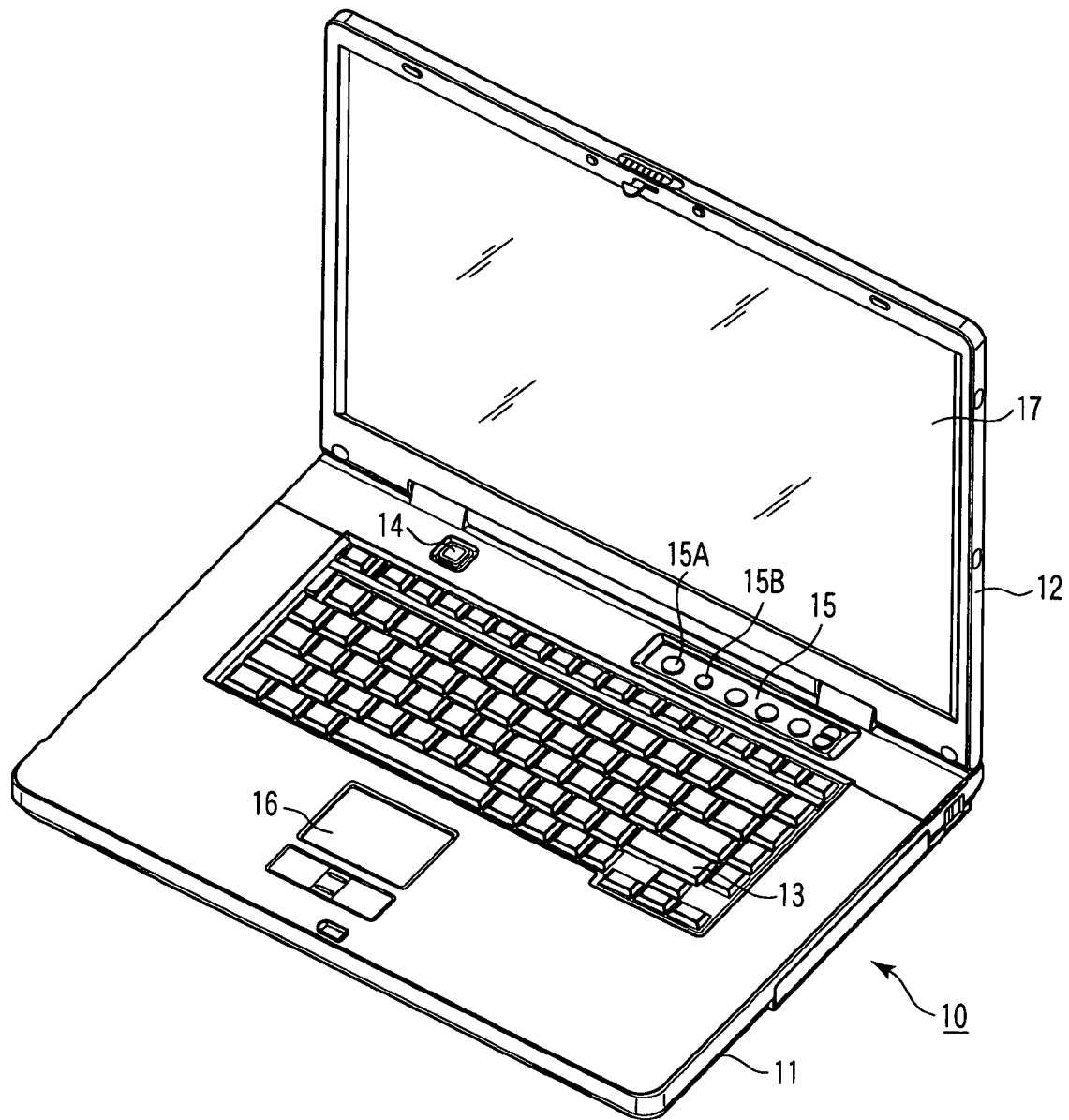
FIG. 1 is an exemplary perspective view of an information processing apparatus according to an embodiment of the invention.

Referring first to FIG. 1, the configuration of an information processing apparatus according to the embodiment will be described. The information processing apparatus is implemented as, for example, a battery-operable, portable notebook personal computer 10.

FIG. 1 is a perspective view of the notebook personal computer 10 whose display unit is open.

The computer 10 includes a main body 11 and a display unit 12. The display unit 12 incorporates a display device that is formed of a liquid crystal display (LCD) 17. The display screen of the LCD 17 is located in almost the central part of the display unit 12.

The display unit 12 is attached to the main body 11 such that it can turn freely between an open position in which the top surface of the main body 11 is exposed and a closed position in which the top surface thereof is covered. The main body 11 is a thin box-shaped housing. The main body 11 includes various heating devices of a central processing unit (CPU), a display controller, a hard disk drive, a bus bridge device and the like.

A keyboard 13, a power button 14 for powering on/off the main body 11, an input operation panel 15 and a touch pad 16 are arranged on the top of the main body 11.

The input operation panel 15 is an input device for inputting an event corresponding to a depressed button and has a plurality of buttons for starting a plurality of functions. These buttons include buttons 15A and 15B for starting specific application programs.

Figure 2:
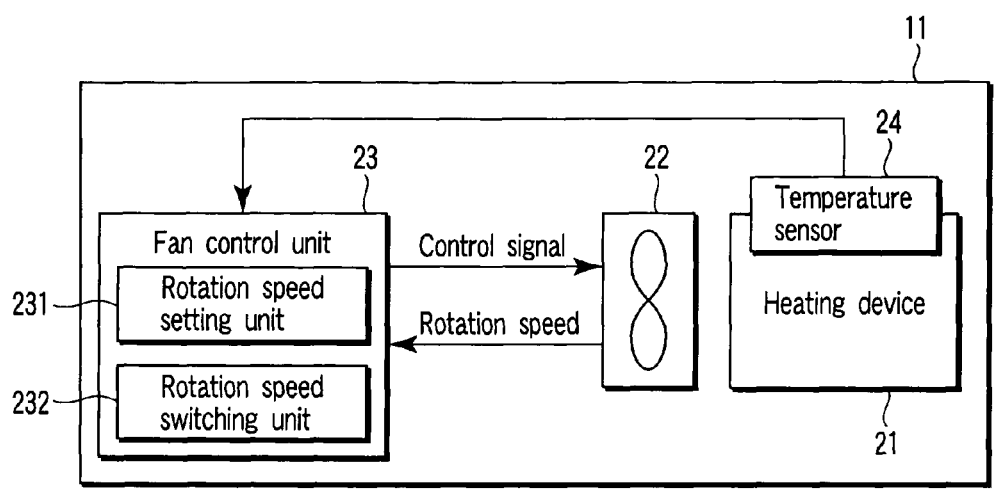
FIG. 2 is an exemplary block diagram illustrating a cooling control mechanism provided in the information processing apparatus shown in FIG. 1.

FIG. 2 shows an example of a cooling mechanism provided in the main body 11 of the computer 10. Referring to FIG. 2, the main body 11 includes a heating device 21, a cooling fan 22, a fan control unit 23 and a temperature sensor 24.

The heating device 21 is a device such as a CPU, a display controller, a hard disk drive and a bus bridge device. The cooling fan 22 is arranged close to the heating device 21 to cool the heating device 21. The cooling fan 22 cools the heating device 21 by air-cooling a heat sink that is thermally connected to the heating device 21 via a heat-receiving unit and the like. The cooling fan 22 also cools the heating device 21 by exhausting heated air from around the heating device 21. For example, the structure described in Japanese Patent No. 3637304 can be used for mounting the cooling fan 22.

The temperature sensor 24 is a sensor for sensing the temperature of the heating device 21. The temperature sensor 24 is provided, e.g., on the heating device 21.

The fan control unit 23 controls the cooling fan 22. The fan control unit 23 supplies the cooling fan 22 with a control signal to control the rotation speed (fan speed) of the cooling fan 22. A rotation speed signal (pulse signal) is fed back to the fan control unit 23 from the cooling fan 22. Using the rotation speed signal, the fan control unit 23 monitors the rotation speed of the cooling fan 22. The cooling fan 22 outputs two pulses per rotation as the rotation speed signal.

While the main body 11 is powered on, the fan control unit 23 continues to rotate the cooling fan 22 at not lower than a given rotation speed (first rotation speed), or the cooling fan 22 does not stop rotating. In other words, while the main body 11 is powered on, the minimum rotation speed of the cooling fan 22 is not zero but the first rotation speed. Since the first rotation speed is adequately low, the computer 10 can be made silent even though the cooling fan 22 rotates at the first rotation speed at all times.

If the temperature of the heating device 21 sensed by the temperature sensor 24 reaches a threshold value, the rotation speed of the cooling fan 22 is changed from the first rotation speed to a second rotation speed which is higher than the first rotation speed. If the heating device 21 is cooled and the temperature thereof sensed by the temperature sensor 24 becomes lower than the threshold value, the rotation speed of the cooling fan 22 is returned to the first rotation speed. While the main body 11 is powered on, the rotation speed of the cooling fan 22 is controlled on the basis of the first rotation speed. This fan control will be referred to as "silent fan control" hereinafter.

The first rotation speed is predetermined on the basis of the characteristic of the cooling fan 22. For example, the first rotation speed is the minimum value within a range capable of controlling the cooling fan 22, or a given value close to the minimum value.

The fan control unit 23 includes a rotation speed setting unit 231 and a rotation speed switching unit 232 to achieve the "silent fan control."

Upon power-on of the main body 11, the rotation speed setting unit 231 performs a process of setting the rotation speed of the cooling fan 22 at the first rotation speed. When the main body 11 is powered on, a system BIOS performs a power on self test (POST) process. Then, an operating system is booted up. The rotation speed setting unit 231 sets the rotation speed of the cooling fan 22 at the first rotation speed during the POST process performed immediately after the main body 11 is powered on. In other words, the unit 231 rotates the cooling fan 22 at the first rotation speed before the operating system is booted up.

The rotation speed switching unit 232 performs a process of switching the rotation speed of the cooling fan 22 from the first rotation speed to the second rotation speed in accordance with the temperature of the heating device 21 sensed by the temperature sensor 24. Actually, the unit 232 controls the rotation speed of the cooling fan 22 not in two steps of the first and second rotation speeds but in five steps of the following first to fifth rotation speeds.

First rotation speed (Silent)
Second rotation speed (Low)
Third rotation speed (Middle)
Fourth rotation speed (High)
Fifth rotation speed (Max)

The rotation speed increases in the following order: Silent, Low, Middle, High and Max. A temperature region is assigned to each of the rotation speeds. The temperature of these temperature regions increases in the following order: Silent, Low, Middle, High and Max.

Figure 3:
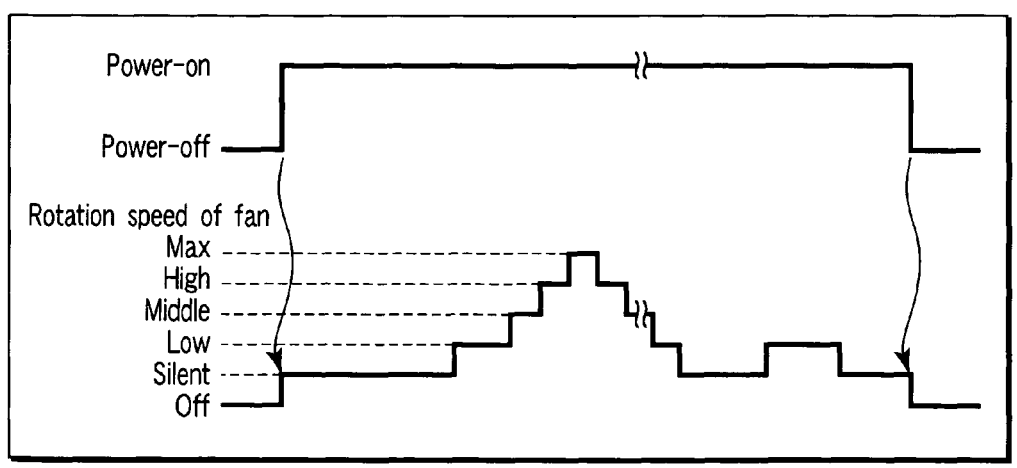
FIG. 3 is an exemplary chart of the rotation speed of a cooling fan, which is varied by silent fan control performed by the information processing apparatus shown in FIG. 1.

FIG. 3 shows the rotation speed of the cooling fan 22, which is varied by the "silent fan control."

When the computer 10 is powered on (or resumed), the rotation speed of the cooling fan 22 is set at the first rotation speed (Silent). Immediately after the computer 10 is powered on, usually, the temperature of the heating device 21 is considerably low and thus the cooling fan 22 need not rotate. If, however, the cooling fan 22 rotates at the first rotation speed (Silent) immediately after the power-on, the temperature of the heating device 21 can be inhibited from increasing afterwards. Since, moreover, the first rotation speed is low, almost no noise is generated.

If the temperature of the heating device 21 increases to a threshold value corresponding to the temperature region of Low, the rotation speed of the cooling fan 22 is switched from the first rotation speed (Silent) to the second rotation speed (Low).

As described above, in accordance with the temperature of the heating device 21, the rotation speed of the cooling fan 22 is automatically switched among Silent, Low, Middle, High and Max.

The rotation speed of the cooling fan 22 can be controlled in six or more steps.

A relationship between the temperature of the heating device 21 and the rotation speed of the cooling fan 22 will be described with reference to FIGS. 4 and 5.

Figure 4:
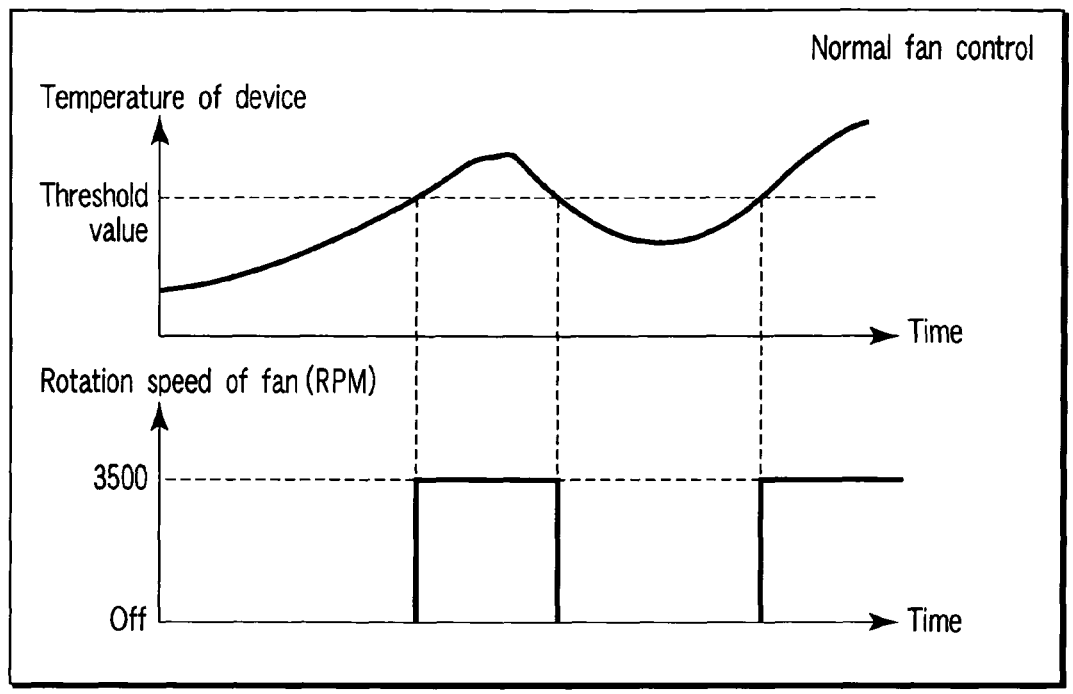
FIG. 4 is an exemplary graph showing a relationship between the temperature of a heating device and the rotation speed of a fan under normal fan control.

FIG. 4 shows a relationship between the temperature of the heating device 21 and the rotation speed of the cooling fan 22 under normal fan control. Under the normal fan control, the rotation speed varies among, for example, "Off," "Low," "Middle," "High" and "Max." The cooling fan 22 does not rotate ("Off") until the temperature of the heating device 21 reaches the threshold value (e.g., 40 degrees) corresponding to "Low." When the temperature reaches the threshold value, the rotation speed increases from zero to the rotation speed (e.g., 3500 rpm) corresponding to "Low." Since the rotation speed suddenly increases by 3500 rpm, a relatively big noise occurs.

If the heating device 21 is cooled and its temperature lowers below the threshold value, the rotations speed is changed to zero. Thus, the rotation speed varies repeatedly between zero and 3500 rpm. Noise occurs like a continuous swell.

Figure 5:
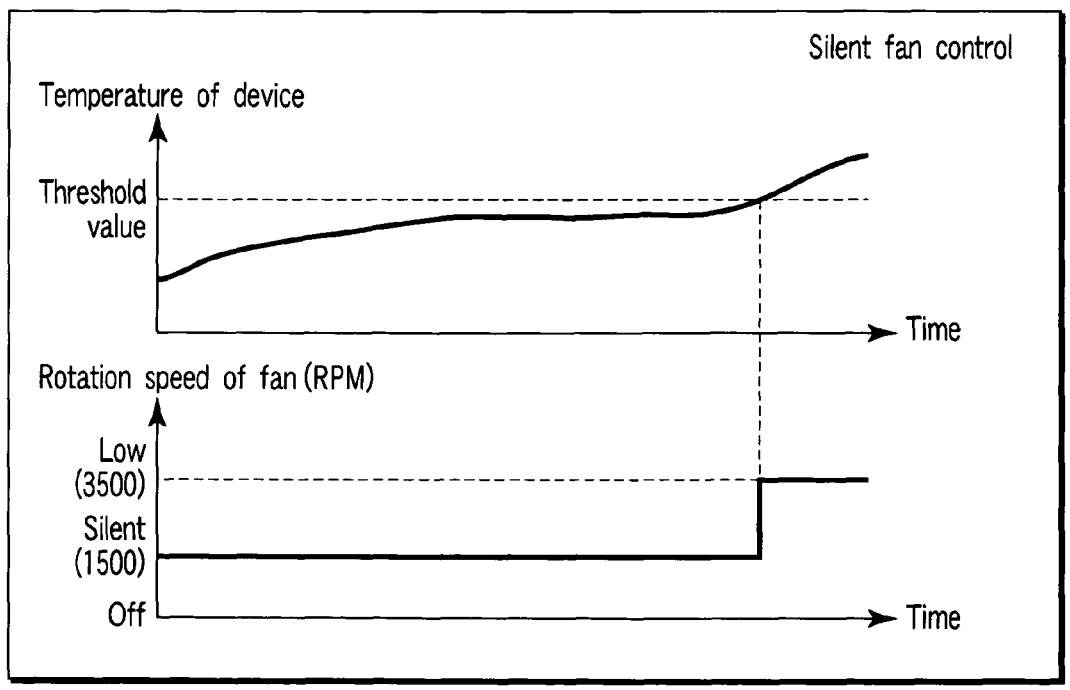
FIG. 5 is an exemplary graph showing a relationship between the temperature of the heating device and the rotation speed of the fan under silent fan control.

FIG. 5 shows a relationship between the temperature of the heating device 21 and the rotation speed of the cooling fan 22 under silent fan control.

The cooling fan 22 rotates at the first rotation speed (e.g., 1500 rpm) at all times even while the temperature of the heating device 21 is adequately low. The heating device 21 can thus be prevented from increasing in temperature. When the temperature of the heating device 21 reaches the threshold value (e.g., 40 degrees) corresponding to "Low," the rotation speed increases to the rotation speed (e.g., 3500 rpm) corresponding to "Low." Since, however, the increase of the rotation speed is only 1500 rpm, noise can be lessened more than that occurring when the rotation speed suddenly increases by 3500 rpm.

The fan startup control for shifting the cooling fan from its off state to its rotating state will be described with reference to FIGS. 6 and 7.

Figure 6:
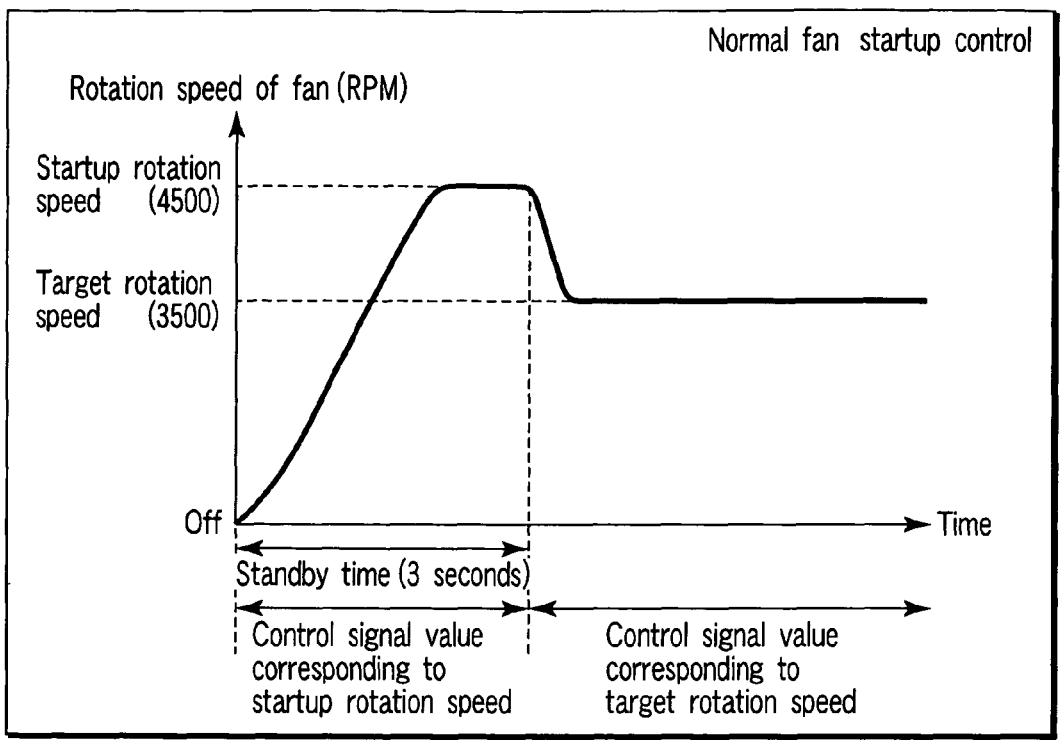
FIG. 6 is an exemplary graph of normal fan startup control.

FIG. 6 shows a normal state of the fan startup control. Greater driving force is required to start to rotate the cooling fan 22.

In order to start to rotate the cooling fan at a target rotation speed (e.g., 3500 rpm), the fan has to be supplied with a control signal for a given period of time. This control signal has a value (duty ratio or voltage) for rotating the fan at a rotation speed (startup rotation speed), which is higher than the target rotation speed (e.g., 3500 rpm). After the rotation speed of the cooling fan is maintained at the startup rotation speed (e.g., 4500 rpm), it is changed to the target rotation speed (e.g., 3500 rpm). The startup rotation speed depends on the characteristics of the cooling fan.

Under the normal fan startup control, a process of standing by until a given period of time (e.g., three seconds) elapses after the supply of the above control signal is carried out. When the given period of time elapses, the value of the control signal is changed from the startup rotation speed (e.g., 4500 rpm) to the target rotation speed (e.g., 3500 rpm).

Using the above control, the rotation speed of the cooling fan rises up to the startup rotation speed (e.g., 4500 rpm) and then lowers to the target rotation speed (e.g., 3500 rpm). Thus, the rotation speed varies greatly, which causes noise that makes a user uncomfortable.

Figure 7:
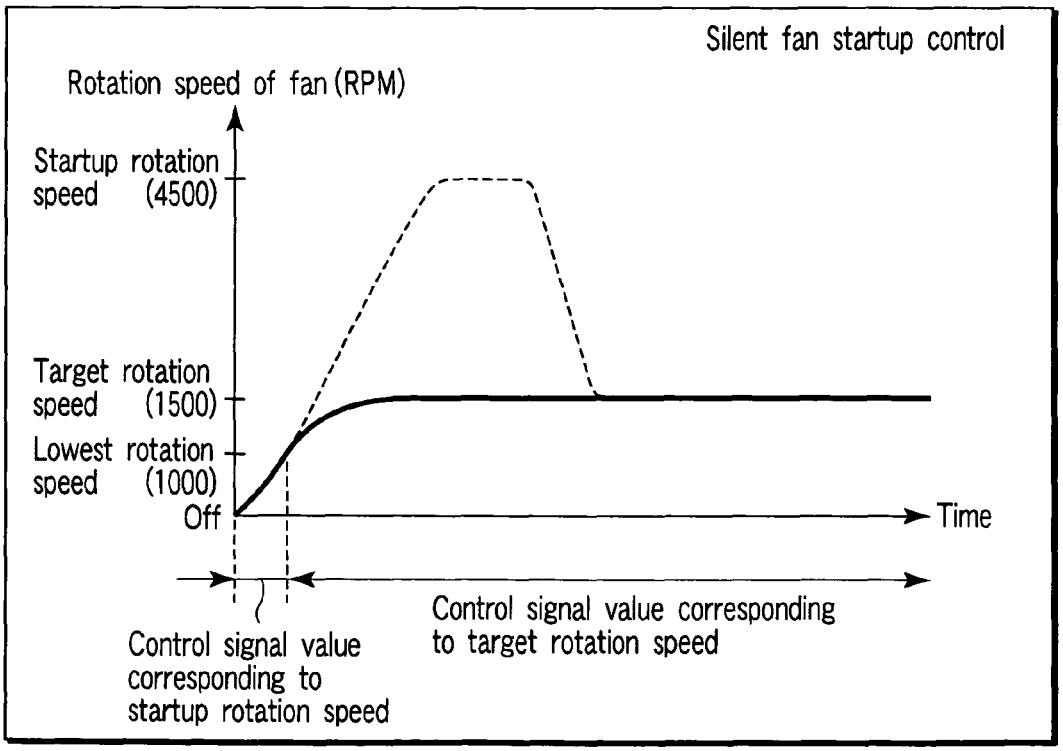
FIG. 7 is an exemplary graph of silent fan startup control performed by the information processing apparatus shown in FIG. 1.

FIG. 7 shows the silent fan startup control used in the present embodiment.

The silent fan startup control is performed when the cooling fan 22 is shifted from its off state to its rotating state at the target rotation speed. For example, the silent fan startup control is used to set the cooling fan 22 at the rotation speed of "Silent" in response to the power-on of the computer 10.

Under the silent fan startup control, the fan control unit 23, and specifically, the rotation speed setting unit 231 supplies the cooling fan 22 with a control signal having a first value for rotating the cooling fan 22 at the startup rotation speed (e.g., 4500 rpm). Supplying the cooling fan 22 with the control signal, the fan control unit 23 monitors the rotation speed of the cooling fan 22 using a rotation speed signal generated from the cooling fan 22. When the rotation speed of the cooling fan 22 is lower than the "Silent" rotation speed (e.g., 1500 rpm) of the target rotation speed and reaches a given rotation speed (referred to as the lowest rotation speed hereinafter) which allows the cooling fan 22 to rotate at a constant speed, the fan control unit 23 supplies the cooling fan 22 with a control signal having a second value for rotating the fan 22 at the "Silent" rotation speed (e.g., 1500 rpm) of the target rotation speed. Thus, the rotation speed of the cooling fan 22 smoothly rises up to the "Silent" rotation speed (e.g., 1500 rpm) of the target rotation speed from zero. Accordingly, noise can greatly be reduced.

If the normal fan startup control is carried out, the rotation speed of the cooling fan 22 rises from zero to the startup rotation speed (e.g., 4500 rpm) and then lowers to the target rotation speed, as indicated by the dotted line in FIG. 7. Under the silent fan startup control, the rotation speed of the cooling fan 22 does not vary as indicated by the dotted line in FIG. 7.

The "Silent" rotation speed and the lowest rotation speed each depend on the characteristics of the cooling fan 22.

Figure 8:
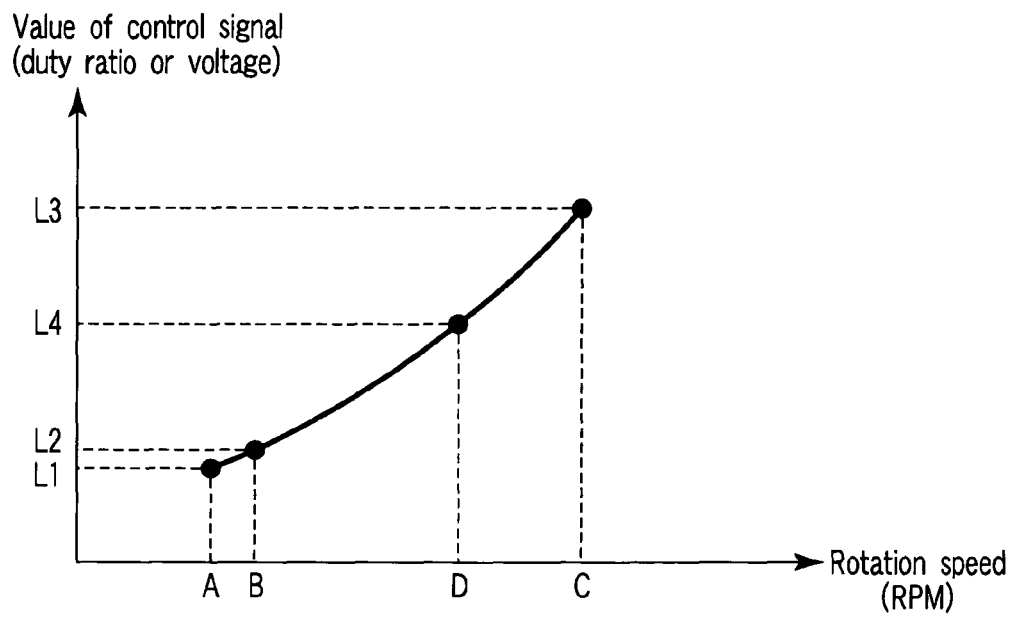
FIG. 8 is an exemplary graph of characteristics of the cooling fan used in the information processing apparatus shown in FIG. 1.

FIG. 8 shows a relationship between the rotation speed of the cooling fan 22 and the value of the control signal (duty ratio or voltage).

Assume now that the constant rotation speed at which the cooling fan 22 can stably rotate ranges from rotation speed A to rotation speed C, and rotation speed D is the startup rotation speed. The value of the control signal corresponding to rotation speed A is L1, and the value of the control signal corresponding to rotation speed C is L3. The value of the control signal corresponding to the startup rotation speed is L4.

For example, the lowest rotation speed is set at the minimum value A within the range of the constant rotation speed at which the cooling fan 22 can stably rotate, and the "Silent" rotation speed is set close to the minimum value A. In other words, the "Silent" rotation speed is set at rotation speed B which is slightly higher than the minimum value A and lower than the startup rotation speed D.

Figure 9:
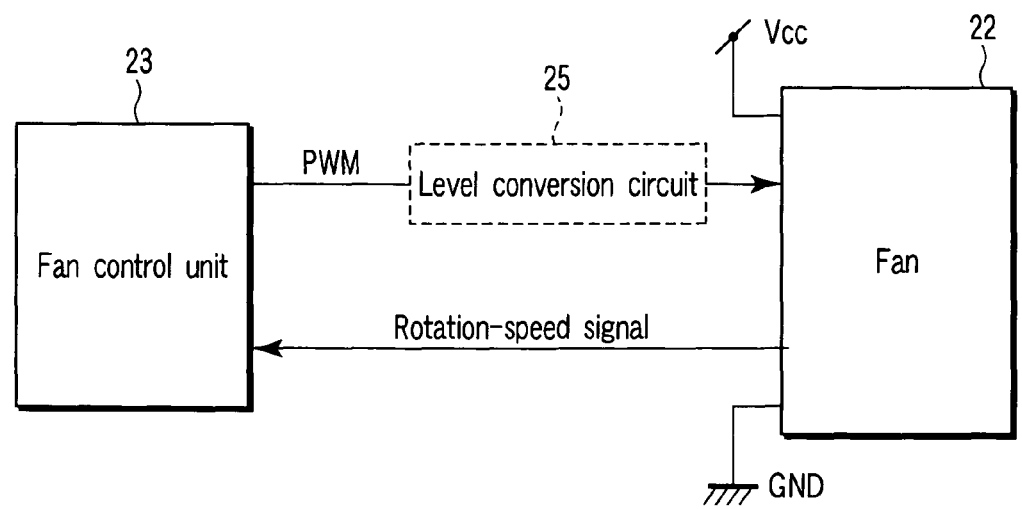
FIG. 9 is an exemplary diagram showing a concrete example of connection between a fan control unit and the cooling fan in the information processing apparatus shown in FIG. 1.

The lowest rotation speed can be set at a value that is slightly higher than the minimum value A since the following relationship has only to be satisfied:

Lowest rotation speed<Target rotation speed ("Silent" rotation speed)<Startup rotation speed FIG. 9 shows a concrete example of connection between the fan control unit 23 and the cooling fan 22.

Favorably, a fan that can be driven directly by a pulse width modulation (PWM) signal (which is referred to as a PWM fan) is employed as the cooling fan 22. The PWM fan can be rotated at lower speed than the normal fan of a voltage-driven type.

The fan control unit 23 supplies the cooling fan 22 with a PWM signal as the above control signal to control the speed of the cooling fan 22. The rotation speed of the cooling fan 22 varies with the duty ratio of the PWM signal.

When the fan control unit 23 and the cooling fan 22 differ in power supply voltage from each other, the PWM signal output from the fan control unit 23 is supplied to the cooling fan 22 via a level conversion circuit 25. The level conversion circuit 25 converts the amplitude of the PWM signal from the power supply voltage of the fan control unit 23 to that of the cooling fan 22. If the power supply voltage of the fan control unit 23 is 3.3V and that of the cooling fan 22 is 5V, the level conversion circuit 25 converts the amplitude of the PWM signal from 3.3V to 5V.

The system configuration of the computer 10 will be described with reference to FIG. 10.

The computer 10 includes a CPU 111, a north bridge 112, a main memory 113, a display controller 114, a south bridge 115, a hard disk drive (HDD) 116, a network controller 117, a flash BIOS-ROM 118, an embedded controller/keyboard controller IC (EC/KBC) 119, and a power supply circuit 120.

The CPU 111 is a processor for controlling the operation of each component of the computer 10. The CPU 111 executes an operating system and various application programs/utility programs. The operating system and programs are loaded into the main memory 113 from the HDD 116. The CPU 111 also executes a basic input output system (BIOS) stored in the flash BIOS-ROM 118. The BIOS is a program for controlling hardware.

The north bridge 112 is a bridge device for connecting a local bus of the CPU 111 and the south bridge 116. The north bridge 112 has a function of communicating with the display controller 114 via an accelerated graphics port (AGP) bus. The north bridge 112 incorporates a memory controller for controlling the main memory 113.

The display controller 114 controls the LCD 17 that is used as a display monitor of the computer 10. The display controller 114 has a 2D or 3D graphics computing function and serves as a graphics accelerator. The south bridge 115 is connected to a peripheral component interconnect (PCI) bus and a low pin count (LPC) bus.

The EC/KBC 119 is a one-chip microcomputer on which an embedded controller for managing power and a keyboard controller for controlling the keyboard (KB) 13 and the touch pad 16 are integrated. The EC/KBC 119 powers on/powers off the computer 10 by a user's depression of the power button 14 in association with the power supply circuit 120. The power supply circuit 120 generates system power, which is to be applied to the components of the computer 10, using a power from a battery 121 or an external power that is applied via an AC adapter 122.

Figure 10:
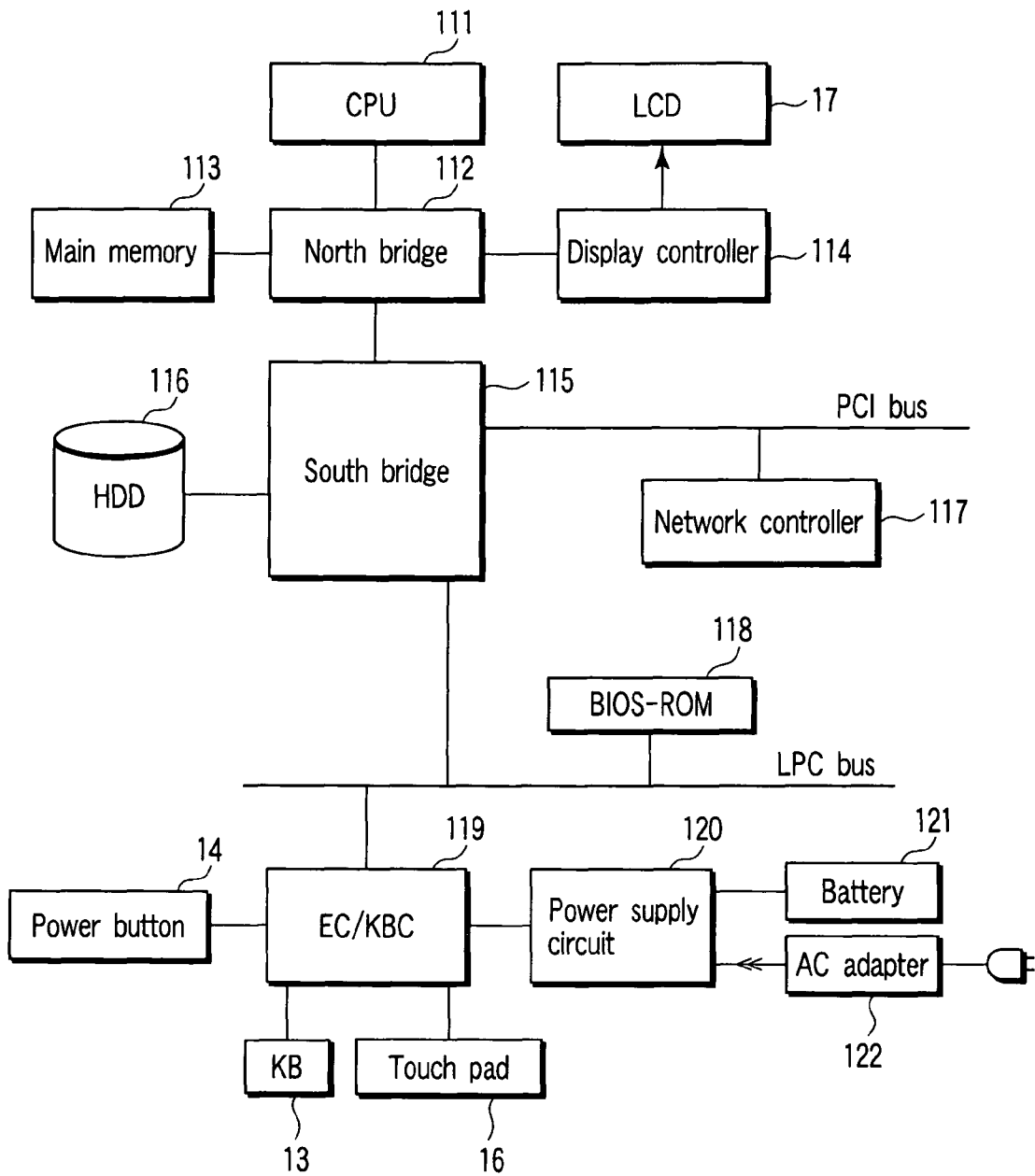
FIG. 10 is an exemplary block diagram of a system configuration of the information processing apparatus shown in FIG. 1.

In the system shown in FIG. 10, for example, the CPU 111, display controller 114, north bridge 112 and HDD 116 are heating devices.

An example of a cooling control mechanism applied to the system shown in FIG. 10 will be described with reference to FIG. 11. Assume here that two cooling fans (FAN#0, FAN#1) cool the CPU 111 and display controller 114.

Figure 11:
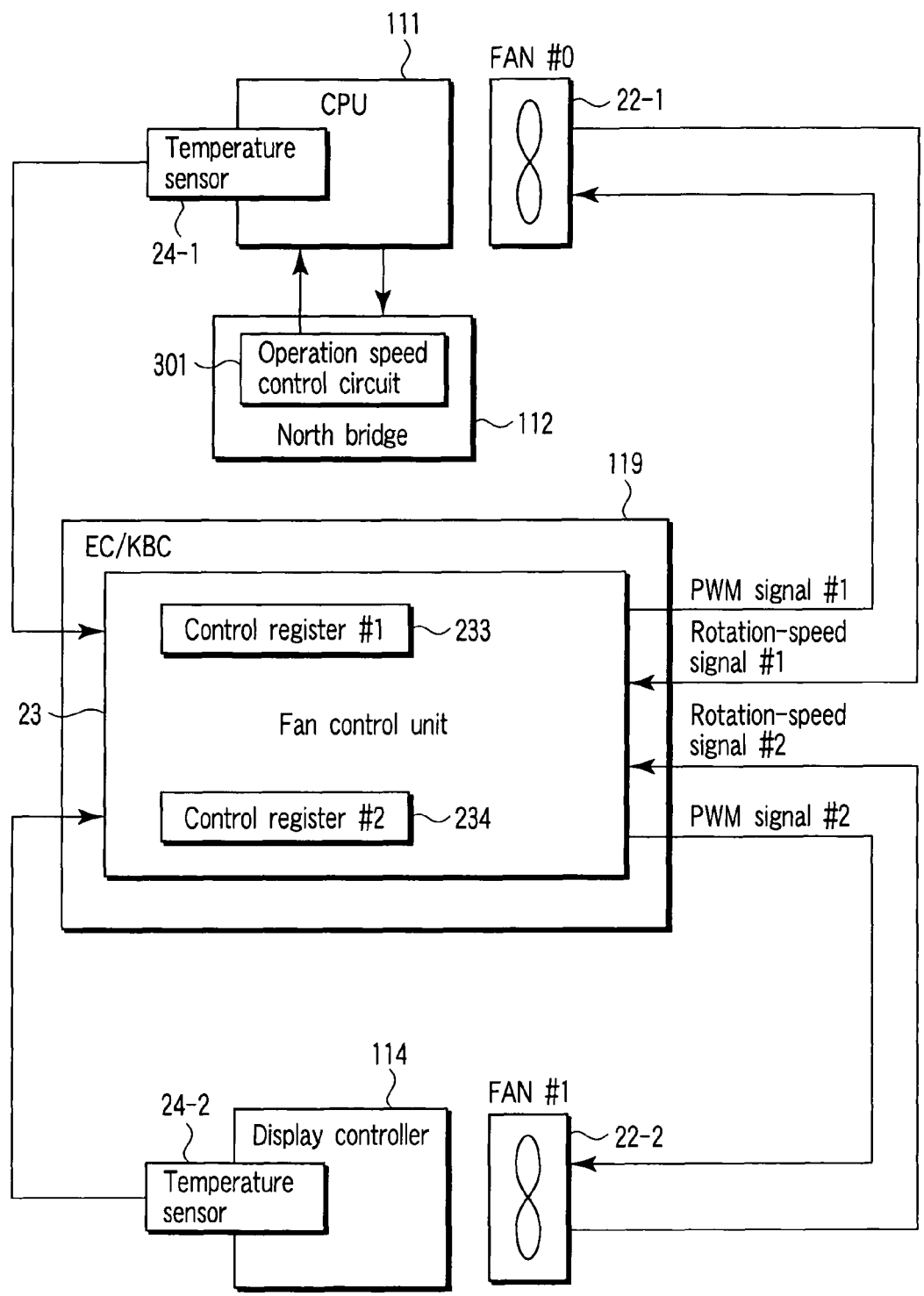
FIG. 11 is an exemplary block diagram of a cooling control mechanism that is applied to the system configuration shown in FIG. 10.

In FIG. 11, a cooling fan (FAN#0) 22-1 cools the CPU 111 and a cooling fan (FAN#1) 22-2 cools the display controller 114. The cooling fans 22-1 and 22-2 are each implemented by the PWM fan described above with reference to FIG. 9. The temperature of the CPU 111 and that of the display controller 114 are sensed by temperature sensors 24-1 and 24-2, respectively.

The fan control unit 23 is provided in, for example, the EC/KBC 119 and configured to control the two cooling fans 22-1 and 22-2. More specifically, the fan control unit 23 controls the rotation speed of the cooling fan 22-1 using a first PWM signal (PWM#1) and receives a rotation speed signal #1 from the cooling fan 22-1. The fan control unit 23 also controls the rotation speed of the cooling fan 22-2 using a second PWM signal (PWM#2) and receives a rotation speed signal #2 from the cooling fan 22-2.

The fan control unit 23 includes two control registers 233 and 234. The BIOS sets a parameter group for controlling the cooling fan 22-1 in the control register 233, and sets a parameter group for controlling the cooling fan 22-2 in the control register 234.

The north bridge 112 includes an operation speed control circuit 301. The operation speed control circuit 301 is a circuit for controlling the operation speed of the CPU 111. The operation speed control circuit 301 varies the operation speed of the CPU 111 stage by stage by changing the frequency of a clock signal of the CPU 111 or by performing a throttling control to operate the CPU 111 intermittently. The CPU 111 can be cooled not only by the cooling fan 22-1 but also by both the cooling fan 22-1 and the operation speed control circuit 301.

Figure 12:
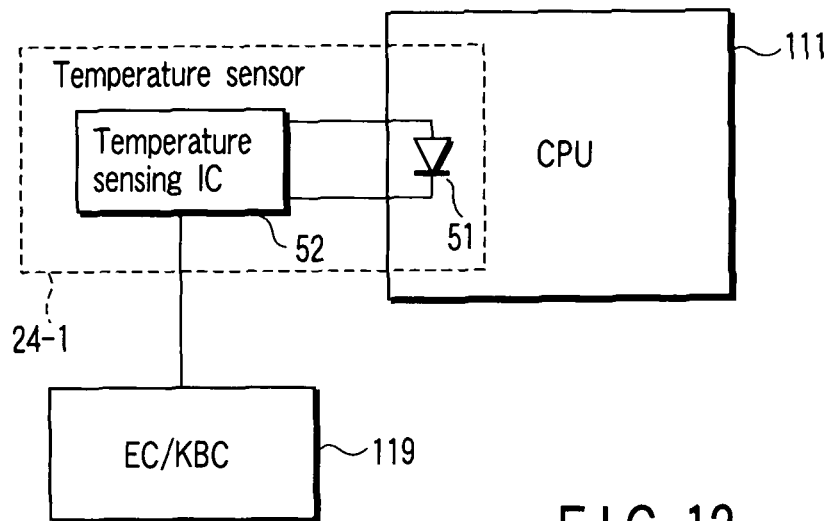
FIG. 12 is an exemplary block diagram of a temperature sensor provided in the information processing apparatus shown in FIG. 1.

FIG. 12 shows an example of the temperature sensor 24-1.

The temperature sensor 24-1 includes a diode 51 and a temperature sensing IC 52. The diode 51 is mounted on or built in the CPU 111. The value of current flowing through the diode 51 varies with the temperature of the CPU 111. The temperature sensing IC 52 converts the value of current into data that represents the temperature of the CPU 111.

Figure 13:
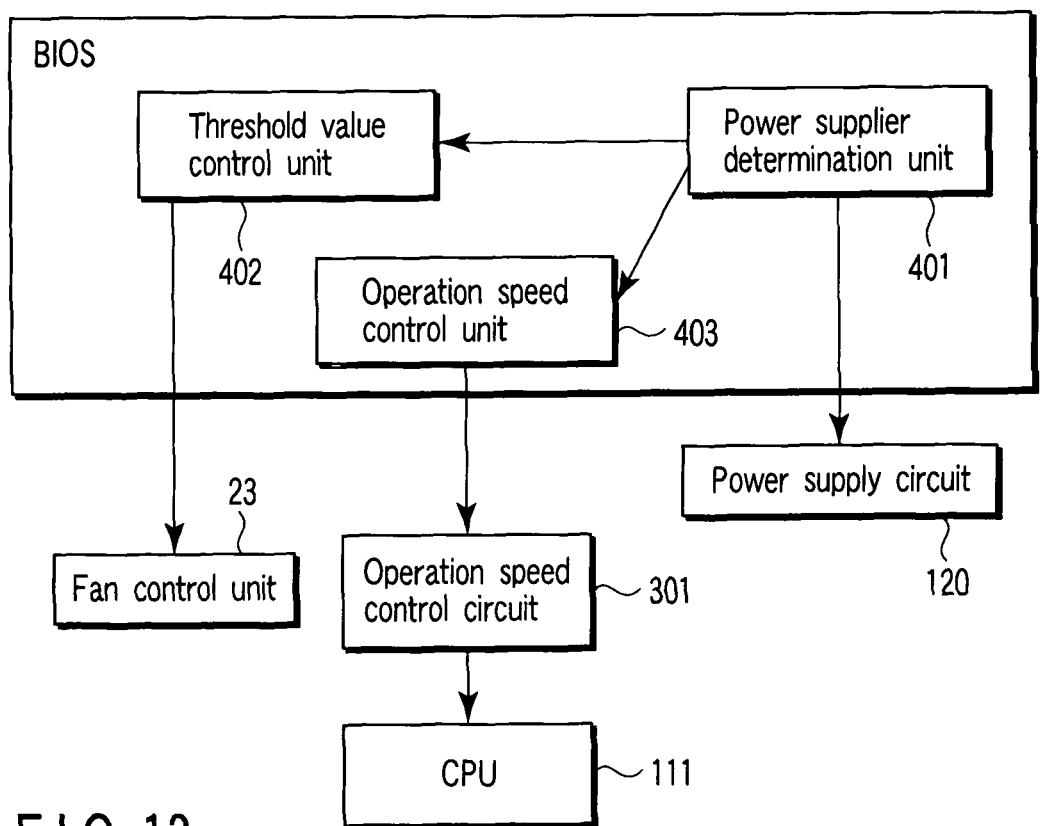
FIG. 13 is an exemplary block diagram illustrating a cooling control mechanism that is applied to a CPU provided in the information processing apparatus shown in FIG. 1.

The cooling control operation of the CPU 111, which is performed by the BIOS, will be described with reference to FIG. 13.

The BIOS includes a power supplier determination unit 401, a threshold value control unit 402 and an operation speed control unit 403 as function modules (software modules) for performing the cooling control operation. The cooling control operation is performed in performance mode or power-saving mode. The performance mode is a cooling mode in which system performance has higher priority than power saving. The power-saving mode is a cooling mode in which power saving has higher priority than system performance. The performance mode is selected when the computer 10 is driven by an external power supply, and the power-saving mode is selected when the computer 10 is driven by the battery 121.

The power supplier determination unit 401 communicates with the power supply circuit 120 and determines which of the battery 121 and the external power supply drives the computer 10.

The threshold value control unit 402 controls the threshold value corresponding to the temperature range of the above "Low" speed, in accordance with the type of a driving power supply of the computer 10. More specifically, when the computer 10 is driven by the external power supply (performance mode), the threshold value corresponding to the temperature range of the "Low" speed is set to a predetermined first value. When the computer 10 is driven by the battery 121 (power-saving mode), the threshold value corresponding to the temperature range of the "Low" speed is set to a predetermined second value. The second value is larger than the first value.

When the computer 10 is driven by the battery 121, there is a strong possibility that the rotation speed of the cooling fan 22-1 will be maintained at "Silent" and the power consumption of the cooling fan 22-1 can be suppressed.

When the computer 10 is driven by the battery 121 (power-saving mode), the operation speed control unit 403 controls the operation speed control circuit 301 and performs an operation speed control process to decrease the operation speed of the CPU 111 in accordance with the temperature of the CPU 111 sensed by the temperature sensor 24-1.

The temperature of the CPU 111 that starts to perform the operation speed control process is set at a value that is lower than a threshold value (second value) corresponding to the temperature range of the "Low" speed in power-saving mode.

For example, it is set at a threshold value (first value) corresponding to the temperature range of the "Low" speed in performance mode. Thus, the operation speed control process starts during which period the cooling fan 22-1 is rotating at the rotation speed of "Silent" and this period can be lengthened.

Figures 14, 15:
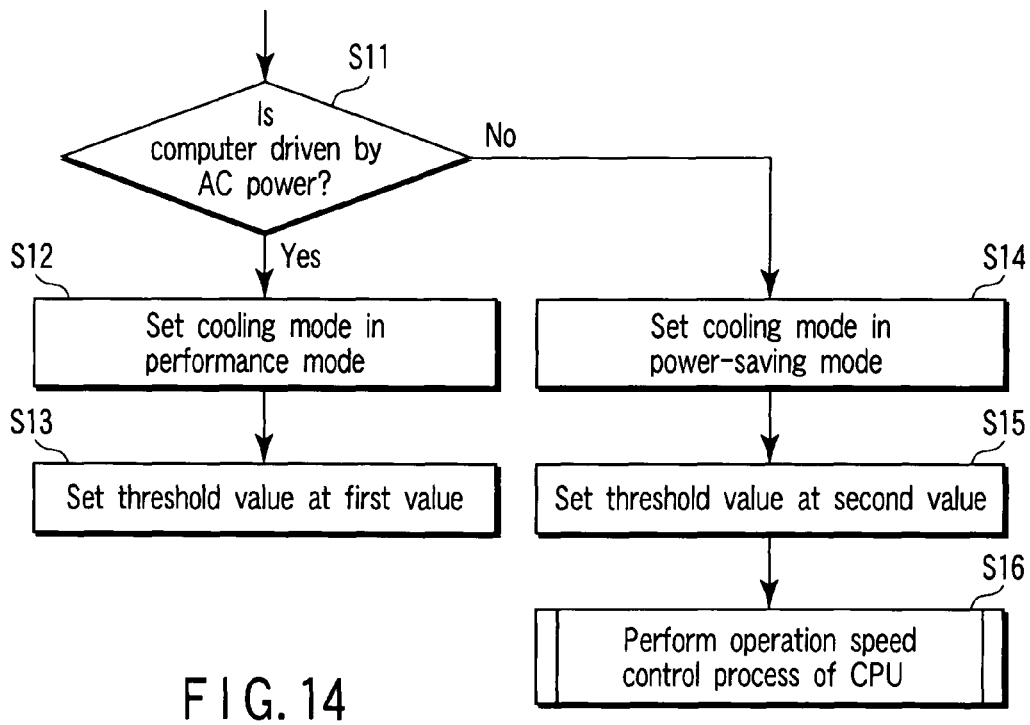
FIG. 14 is an exemplary flowchart of a procedure for a cooling control operation that is applied to the CPU provided in the information processing apparatus shown in FIG. 1.
FIG. 15 is an exemplary table used in the information processing apparatus shown in FIG. 1.

FIG. 14 is a flowchart of a procedure for the cooling control operation.

The BIOS first determines whether the computer 10 is driven by AC power, or whether the computer 10 is driven by an external power supply (block S11).

If the computer 10 is driven by an external power supply (YES in block S11), the BIOS sets the cooling mode in performance mode and sets the threshold value corresponding to the temperature range of "Low" speed in the above first value (Blocks S12 and S13).

If the computer 10 is driven by the battery 121 (NO in block S11), the BIOS sets the cooling mode in power-saving mode and sets the threshold value corresponding to the temperature range of "Low" speed in the above second value (Blocks S14 and S15). The BIOS performs the operation speed control process of the CPU 111 (block S16).

FIG. 15 is a table that defines a relationship between the temperature of the CPU and the rotation speed of each of the cooling fans in both the performance and power-saving modes. This table is managed by the BIOS.

In the performance mode, the temperature of the CPU 111 is managed by five temperature ranges of temperature levels 0 to 4. When the temperature falls within the temperature range of temperature level 0, the rotation speed of the cooling fan (FAN#0) 22-1 is set at "Silent." When the temperature falls within the temperature range of temperature level 1, the rotation speed of the cooling fan (FAN#0) 22-1 is set at "Low." When the temperature falls within the temperature range of temperature level 2, the rotation speed of the cooling fan (FAN#0) 22-1 is set at "Middle." When the temperature falls within the temperature range of temperature level 3, the rotation speed of the cooling fan (FAN#0) 22-1 is set at "High." When the temperature falls within the temperature range of temperature level 4, the rotation speed of the cooling fan (FAN#0) 22-1 is set at "Max." Even though the operation speed control process is not performed but the temperature of the CPU 111 falls within any of temperature levels 0 to 4, the CPU 111 operates at 100% operation speed at all times.

In the power-saving mode, the temperature of the CPU 111 is managed by seven temperature ranges of temperature levels 0 to 6. When the temperature falls within the temperature ranges of temperature level 0 to 2, the rotation speed of the cooling fan (FAN#0) 22-1 is set at "Silent." When the temperature falls within the temperature range of temperature level 3, the rotation speed of the cooling fan (FAN#0) 22-1 is set at "Low." When the temperature falls within the temperature range of temperature level 4, the rotation speed of the cooling fan (FAN#0) 22-1 is set at "Middle." When the temperature falls within the temperature range of temperature level 5, the rotation speed of the cooling fan (FAN#0) 22-1 is set at "High." When the temperature falls within the temperature range of temperature level 6, the rotation speed of the cooling fan (FAN#0) 22-1 is set at "Max."

In the power-saving mode, when the temperature of the CPU 111 falls within the temperature range of temperature level 1, the operation speed control process decreases the operation speed of the CPU 111 to 75% of the maximum operation speed. When the temperature falls within the temperature ranges of temperature levels 2 to 6, the operation speed control process decreases the operation speed of the CPU 111 to 50% of the maximum operation speed.

Figures 16, 17, 18:
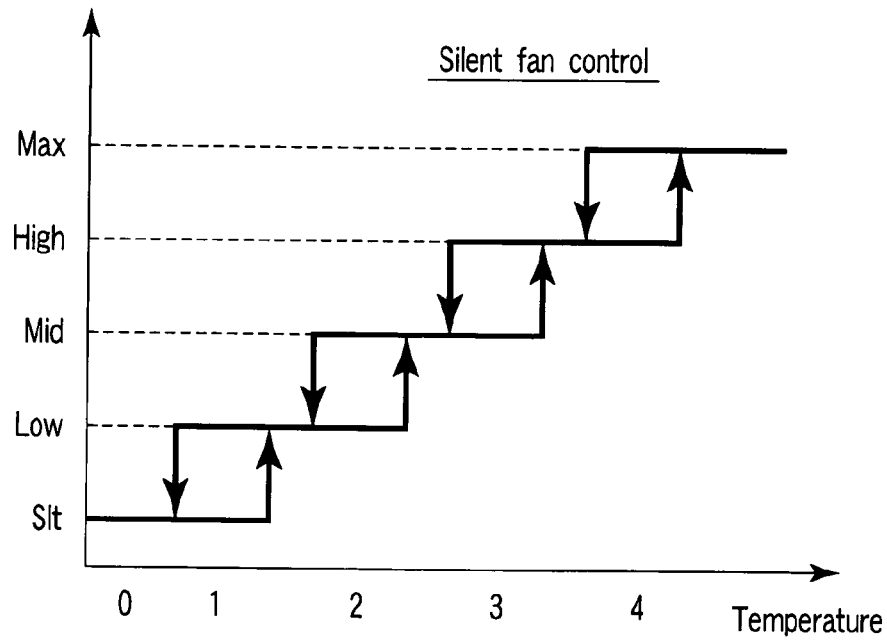
FIG. 16 is an exemplary table of the rotation speeds of a fan used in the information processing apparatus shown in FIG. 1.
FIG. 17 is an exemplary graph showing a transition of the rotation speed of the fan when a cooling mode used in the information processing apparatus shown in FIG. 1 is a performance mode.
FIG. 18 is an exemplary table of fan control parameters used in the information processing apparatus shown in FIG. 1.

FIG. 16 shows an example of the rotation speeds of the fan, which correspond to "Silent," "Low," "Middle," "High" and "Max."

The BIOS determines the target rotation speed of the cooling fan 22-1 on the basis of the temperature of the CPU 111 sensed by the temperature sensor 24-1 and the table shown in FIG. 15. The BIOS sets data for designating the target rotation speed in the fan control unit 23. Needless to say, the target rotation speed of the cooling fan 22-1 can be determined by the fan control unit 23.

FIG. 17 shows an example of a transition of the rotation speed of the fan corresponding to the performance mode.

Assume here that the threshold value (first threshold value) used when the rotation speed of the fan increases and the threshold value (second threshold value) used when the rotation speed decreases differ from each other for each boundary between the rotation speeds. The second threshold value is set lower than the first threshold value.

When the temperature of the heating device such as the CPU and the display controller falls within a considerably lower-level temperature range of temperature level 0, the fan rotates at rotation speed "Silent." When the temperature of the heating device reaches the first threshold value corresponding to temperature level 1 (the upper limit of the temperature range of temperature level 1), the rotation speed of the fan is changed from "Silent" to "Low." When the temperature reaches the first threshold value corresponding to temperature level 2 (the upper limit of the temperature range of temperature level 2), the rotation speed of the fan is changed from "Low" to "Middle."

When the temperature of the heating device starts to lower below the second threshold value of temperature level 2 (the lower limit of the temperature range of temperature level 2), the rotation speed of the fan is changed from "Middle" to "Low." When the temperature of the heating device lowers further below the second threshold value of temperature level 1 (the lower limit of the temperature range of temperature level 1), the rotation speed of the fan is changed from "Low" to "Silent."

As described above, the threshold value (first threshold value) used when the rotation speed of the fan increases and the threshold value (second threshold value) used when the rotation speed decreases are defined for each boundary between the rotation speeds. It is thus possible to prevent the rotation speed of the fan from being frequently switched between adjacent two rotations speeds.

A parameter group set in the fan control unit 23 by the BIOS will be described with reference to FIG. 18.

As described above, a parameter group for controlling the cooling fan (FAN#0) 22-1 is set in the control register 233 of the fan control unit 23, and a parameter group for controlling the cooling fan (FAN#1) 22-2 is set in the control register 234 of the fan control unit 23.

The parameter group set in the control register 233 includes a $\Delta$rpm/$\Delta$digit characteristic, a startup control signal value (or startup rotation speed), the lowest rotation speed, and a target rotation speed.

The $\Delta$rpm/$\Delta$digit characteristic indicates how much the rotation speed of the cooling fan (FAN#0) 22-1 varies with the variation of control data for designating the duty ratio of a PWM signal. On the basis of the $\Delta$rpm/$\Delta$digit characteristic, the fan control unit 23 controls the duty ratio of the PWM signal. The startup control signal value (or startup rotation speed) indicates a value (duty ratio) of a control signal necessary for rotating the cooling fan (FAN#0) 22-1 at the above startup rotation speed. The lowest rotation speed indicates, for example, the minimum value of the rotation speed range capable of rotating the cooling fan (FAN#0) 22-1 at constant speed.

The $\Delta$rpm/$\Delta$digit characteristic, startup control signal value (or startup rotation speed), lowest rotation speed and target rotation speed are also set in the control register 234.

Figure 19:
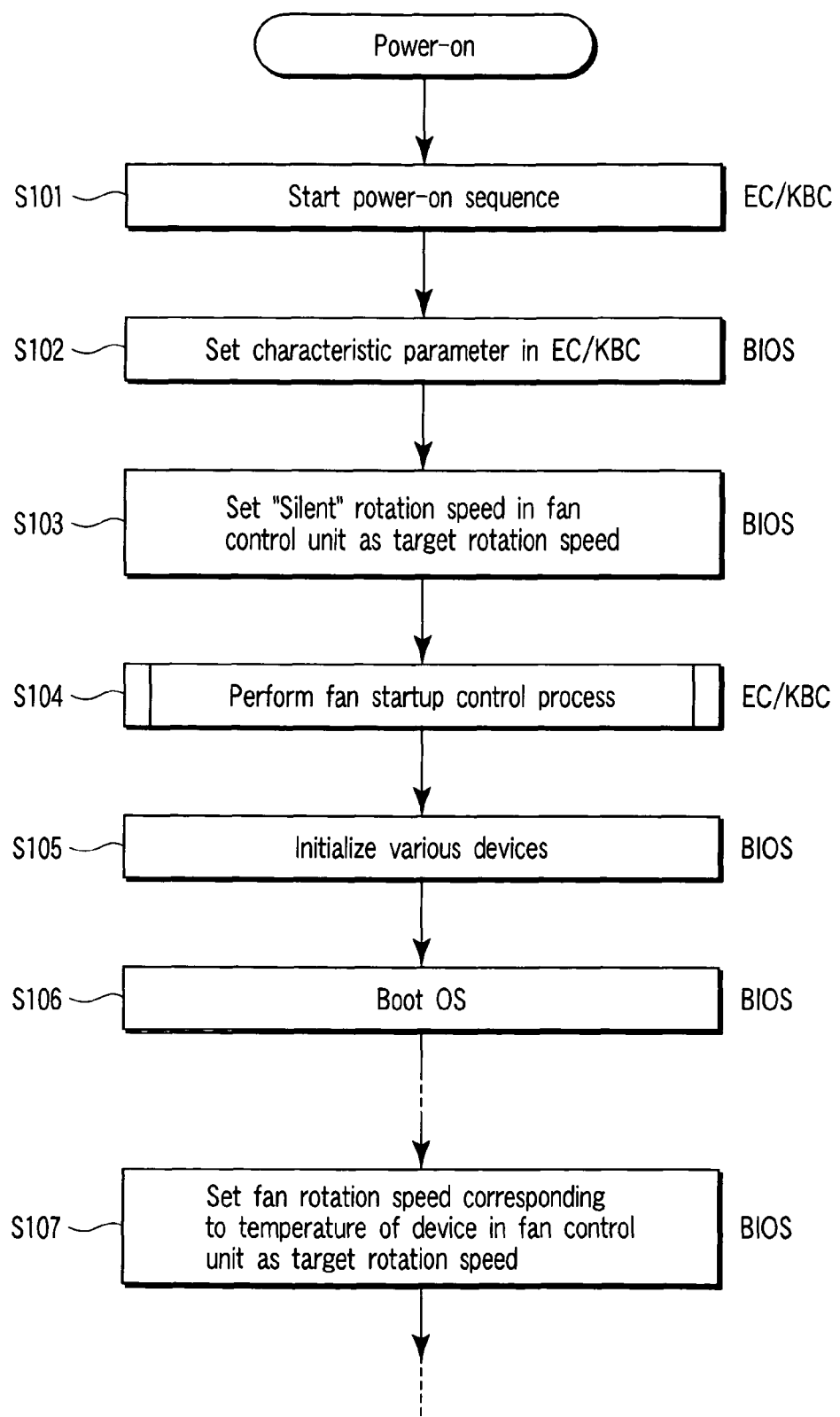
FIG. 19 is an exemplary flowchart illustrating a procedure for performing a cooling control process by the information processing apparatus shown in FIG. 1.

A procedure for performing a cooling control process by the computer 10 will be described with reference to the flowchart shown in FIG. 19.

When a user turns on the power switch 14, the EC/KBC 119 starts a power-on sequence for powering on the computer 10 (block S101). The components of the computer 10 are therefore supplied with operating power. The CPU 111 executes the BIOS.

The BIOS sets the characteristic parameters (Δrpm/Δdigit characteristic, startup control signal value, and lowest rotation speed) in the control registers 233 and 234 of the EC/KBC 119 and sets the rotation speed of the fan corresponding to "Silent" in the control registers 233 and 234 as a target rotation speed (blocks S102 and S103). The fan control unit 23 of the EC/KBC 119 performs a silent fan startup control process to shift each of the cooling fans 22-1 and 22-2 from its off state to a state in which it rotates at the rotation speed of "Silent" (block S104).

The BIOS initializes each device (block S105) and then boots up the operating system (block S106). Then, the BIOS performs a process of setting the rotation speed of the fan corresponding to the temperature of the CPU 111 in the EC/KBC 119 as the target rotation speed of the cooling fan 22-1 and a process of setting the rotation speed of the fan corresponding to the temperature of the display controller 114 in the EC/KBC 119 as the target rotation speed of the cooling fan 22-2 (block S107).

The process of each of blocks S103 and S107 can be performed by the fan control unit 23 in the EC/KBC 119.

Figure 20:
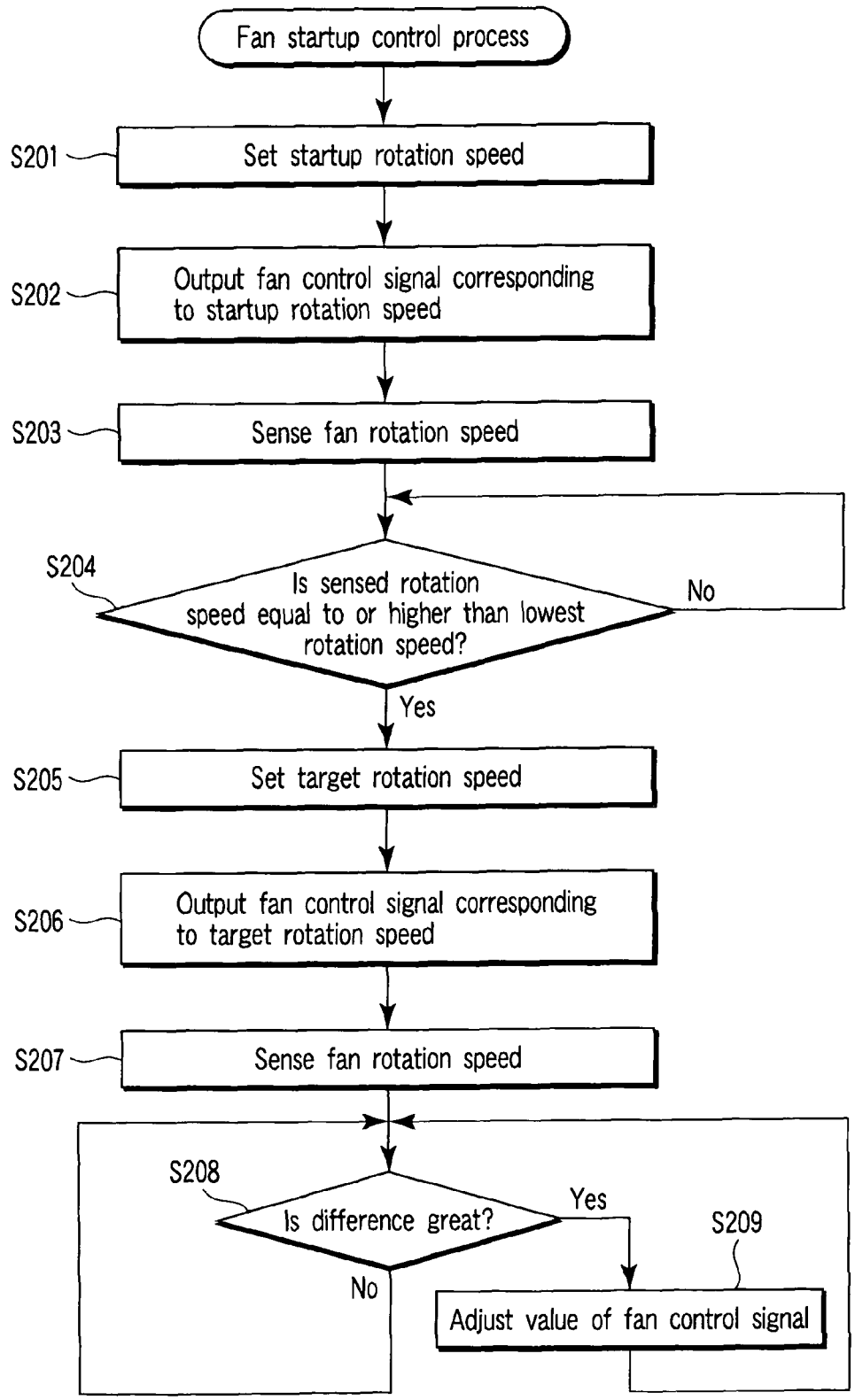
FIG. 20 is an exemplary flowchart illustrating a procedure for a fan startup control process performed by the information processing apparatus shown in FIG. 1.

A procedure for performing a silent fan startup control process in block S104 shown in FIG. 19 will be described with reference to the flowchart shown in FIG. 20.

First, the EC/KBC 119 sets the startup rotation speed in the fan control unit 23 (block S201). The fan control unit 23 supplies the cooling fan 22-1 with a control signal having a value (duty ratio or voltage) corresponding to the startup rotation speed (block S202). The fan control unit 23 senses the rotation speed of the cooling fan 22-1 using a rotation speed signal supplied from the cooling fan 22-1 (block S203) and determines whether the rotation speed of the cooling fan 22-1 is the above lowest rotation speed or higher (block S204). The fan control unit 23 stands by until the rotation speed of the cooling fan 22-1 reaches the lowest rotation speed.

When the rotation speed of the cooling fan 22-1 is the lowest rotation speed or higher (YES in block S204), the EC/KBC 119 sets the target rotation speed (rotation speed corresponding to "Silent") in the fan control unit 23 (block S205). The fan control unit 23 supplies the cooling fan 22-1 with a control signal having a value (duty ratio or voltage) corresponding to the target rotation speed (rotation speed corresponding to "Silent") (block S206). As has been described with reference to FIG. 7, therefore, the rotation speed of the cooling fan 22-1 smoothly rises from zero to the target rotation speed (rotation speed corresponding to "Silent").

The fan control unit 23 senses the rotation speed of the cooling fan 22-1 using a rotation speed signal supplied from the cooling fan 22-1 (block S207) and determines whether a difference between the rotation speed of the cooling fan 22-1 and the target rotation speed (rotation speed corresponding to "Silent") is greater than a given value (block S208). If the difference is greater than the given value (YES in block S208), the fan control unit 23 increases or decreases the value (duty ratio or voltage) of the control signal on the basis of the difference and the Δrpm/Δdigit characteristic (block S209).

The rotation speed of the fan is therefore set in the rotation speed corresponding to "Silent."

The fan control unit 23 also performs the processes of blocks S201 to S209 for the cooling fan 22-2.

In the embodiment of the invention described above, while computer 10 is powered on, the fan rotates at low speed at all times even though the temperature of the heating device 21 is adequately low. The heating device 21 can thus be prevented from increasing in temperature with almost no noise. When the temperature of the heating device 21 increases up to the threshold temperature necessary for cooling the heating device 21, the rotation speed of the fan can be set at the target rotation speed corresponding to the threshold temperature simply by increasing the rotation speed of the fan slightly. Great quietness can thus be achieved as compared with the case where the rotation speed of the fan rises from zero to the target rotation speed at once.

Consequently, according to the embodiment of the invention, the heating device can be cooled with efficiency with low noise.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a main body;
a heating device provided in the main body;
a cooling fan provided in the main body, the cooling fan to cool the heating device;
a temperature sensor provided in the main body, the temperature sensor to sense a temperature of the heating device;
a fan control unit provided in the main body, the fan control unit to (i) rotate the cooling fan at a first rotation speed or higher during power-on of the information processing apparatus, the first rotation speed being a value within a rotation speed range which allows the cooling fan to rotate at a constant speed, and (ii) switch a rotation speed of the cooling fan to a second rotation speed which is higher than the first rotation speed when the temperature of the heating device sensed by the temperature sensor reaches a threshold value; and
a threshold value control unit to (i) set the threshold value to a first value when the information processing apparatus is set in a performance mode in which performance has higher priority than power saving and the cooling fan is used for cooling the heating device and (ii) set the threshold value to a second value which is higher than the first value when the information processing apparatus is set in a power-saving mode in which power saving has higher priority than performance and the cooling fan is used for cooling the heating device, the threshold value, the first value and the second value being temperature values,
wherein the fan control unit
supplies the cooling fan with a control signal having a first control signal value for rotating the cooling fan at a start up rotation speed upon power-on of the information processing apparatus,
monitors a rotation speed of the cooling fan, and
when the monitored rotation speed reaches a minimum value of the rotation speed range, changes a value of the control signal from the first control signal value to a second control signal value for rotating the cooling fan at a first rotation speed, the start up rotation speed being higher than the first rotation speed.

2. The information processing apparatus according to claim 1, wherein the fan control unit includes a rotation speed setting unit which sets the rotation speed of the cooling fan at the first rotation speed before an operating system is booted up.

3. The information processing apparatus according to claim 1, wherein the heating device is a central processing unit (CPU).

4. The information processing apparatus according to claim 1, wherein the heating device is a display controller which controls a display device.

5. The information processing apparatus according to claim 1, wherein the heating device is a central processing unit (CPU), and further comprising:
- a power supplier determination unit which determines which of a battery and an external power supply drives the information processing apparatus;
- a threshold value control unit which sets the threshold value to a first value when the main body is driven by the external power supply and sets the threshold value to a second value which is higher than the first value when the main body is driven by the battery; and
- an operation speed control unit which performs an operation speed control process to decrease an operation speed of the central processing unit (CPU) in accordance with a temperature of the central processing unit (CPU) sensed by the temperature sensor when the main body is driven by the battery.

6. A cooling control method of cooling a heating device provided in an information processing apparatus, the method comprising:
- sensing a temperature of the heating device by a temperature sensor;
- performing a fan control process (i) to rotate a cooling fan, which cools the heating device, at a first rotation speed during power-on of the information processing apparatus, the first rotation speed being a value within a rotation speed range which allows the cooling fan to rotate at a constant speed, and (ii) to switch a rotation speed of the cooling fan to a second rotation speed which is higher than the first rotation speed when the temperature of the heating device sensed by the temperature sensor reaches a threshold value;
- setting the threshold value to a first value when the information processing apparatus is set in a performance mode in which performance has higher priority than power saving and the cooling fan is used for cooling the heating device; and
- setting the threshold value to a second value which is higher than the first value when the information processing apparatus is set in a power-saving mode in which power saving has higher priority than performance and the cooling fan is used for cooling the heating device, the threshold value, the first value and the second value being temperature values, wherein the fan control process is performed
- to supply the cooling fan with a control signal having a first control signal value for rotating the cooling fan at a start up rotation speed upon power-on of the information processing apparatus,
- to monitor a rotation speed of the cooling fan, and
- when the monitored rotation speed reaches a minimum value of the rotation speed range, to change a value of the control signal from the first control signal value to a second control signal value for rotating the cooling fan at a first rotation speed, the start up rotation speed being higher than the first rotation speed.

7. The method according to claim 6, wherein the fan control process includes a process of setting the rotation speed of the cooling fan at the first rotation speed before an operating system is booted up.

8. The method according to claim 6, wherein the heating device is a central processing unit (CPU), and further comprising:
- determining which of a battery and an external power supply drives the information processing apparatus;
- setting the threshold value to a first value when the information processing unit is driven by the external power supply and setting the threshold value to a second value which is higher than the first value when the information processing unit is driven by the battery; and
- performing an operation speed control process to decrease an operation speed of the central processing unit (CPU) in accordance with a temperature of the central processing unit (CPU) sensed by a temperature sensor when the information processing unit is driven by the battery.

9. An apparatus comprising:
- a cooling fan;
- a temperature sensor; and
- a fan control unit in communication with the cooling fan and the temperature sensor, the fan control unit to (i) rotate the cooling fan at a first rotation speed during power-on of the apparatus, the first rotation speed being a value within a rotation speed range which allows the cooling fan to rotate at a constant speed, and (ii) switch a rotation speed of the cooling fan to a second rotation speed that is higher than the first rotation speed when the temperature sensed by the temperature sensor reaches a threshold value; and
- a threshold value control unit to (i) set the threshold value to a first value when the apparatus is set in a performance mode in which performance has higher priority than power saving and the cooling fan is used for cooling the heating device and (ii) set the threshold value to a second value which is higher than the first value is set in a power-saving mode in which power saving has higher priority than performance and the cooling fan is used for cooling the heating device, the threshold value, the first value and the second value being temperature values, wherein the fan control unit
- supplies the cooling fan with a control signal having a first control signal value for rotating the cooling fan at a start up rotation speed upon power-on of the information processing apparatus,
- monitors a rotation speed of the cooling fan, and
- when the monitored rotation speed reaches a minimum value of the rotation speed range, changes a value of the control signal from the first control signal value to a second control signal value for rotating the cooling fan at a first rotation speed, the start up rotation speed being higher than the first rotation speed.

10. The apparatus according to claim 9, wherein the temperature sensor to sense the temperature of a heating device.

11. The apparatus according to claim 10, wherein the heating device is a central processing unit.

12. The apparatus according to claim 10, wherein the heating device is a display controller which controls a display device.

* * * * *